United States Patent

[11] 3,589,782

| [72] | Inventors | Albert F. Le Breton<br>Media;<br>Ronald E. Warner, Media; Albert A.<br>Raimondi, Monroeville, all of, Pa. |
|---|---|---|
| [21] | Appl. No. | 859,017 |
| [22] | Filed | Sept. 18, 1969 |
| [45] | Patented | June 29, 1971 |
| [73] | Assignee | Westinghouse Electric Corporation<br>Pittsburgh, Pa. |

[54] DAMPER BEARING TO INCREASE ROTOR STABILITY
9 Claims, 3 Drawing Figs.

| [52] | U.S. Cl. | 308/122 |
|---|---|---|
| [51] | Int. Cl. | F16c 1/24 |
| [50] | Field of Search | 308/122, 9, 184, 26 |

[56] References Cited
UNITED STATES PATENTS

| 2,631,901 | 3/1953 | Holben et al. | 308/184 |
| 3,172,709 | 3/1965 | Baudry | 308/9 |
| 3,357,757 | 12/1967 | Morley et al. | 308/26 |
| 3,395,857 | 8/1968 | Petrie et al. | 308/9 |

*Primary Examiner*—Martin P. Schwadron
*Assistant Examiner*—Frank Susko
*Attorneys*—A. T. Stratton and F. P. Lyle ABSTRACT: An annular bearing structure which minimizes vibrations from a rotating turbine shaft at the pedestal. The bearing structure comprises an inner bearing member and an outer bearing member which is secured to the pedestal. The inner bearing member receives the journal and has on opposite ends two annular flanges extending radially outward. The outer bearing member is spaced between the flanges and the inner bearing wall so that a narrow annular channel is formed between the bearing members. Pumping means supplies the channel with pressurized lubricant which in combination with the bearing members provides a damping characteristic. Resilient bars are inserted through corresponding holes in the bearing members to help maintain a spaced relation between the bearing members.

PATENTED JUN29 1971

WITNESSES
Theodore F. Wrobel
Bruce L. Samlan

INVENTORS
Albert F. LeBreton,
Ronald E. Warner
& Albert A. Raimondi
BY

DAMPER BEARING TO INCREASE ROTOR STABILITY

BACKGROUND OF THE INVENTION

The present invention relates to an improved bearing support which minimizes the transmission of vibrations from a rotating shaft to its bearing support structures and inhibits rotor-bearing motions of the self-excited type. Excitation causing the vibrations of the rotating shaft at its journal portion particularly in steam turbines and other large rotating equipment is commonly termed rotor whirl. Self-excited whirl can result from the movement of the lubricant at the bearing itself, or from the dynamics of the motive fluid as it goes through the turbine, or from hysteresis caused by movement of sliding parts on the rotor.

Bearings of the type to which this invention pertains are shown in H. W. Semar U.S. Pat. No. 3,015,523 issued Jan. 2, 1962 and B. B. Winer and V. G. Sorokin U.S. Pat. No. 3,044,838 issued July 17, 1962, both assigned to the same assignee as this invention.

SUMMARY OF THE INVENTION

According to this invention there is provided a bearing structure for rotatably supporting the journal portion of a rotatable shaft. The bearing structure is comprised of an inner bearing member and an outer bearing member, the outer bearing member being received within a pedestal. A pressurized oil system supplies lubricant to the bearing structure. An annular channel is defined between the inner and outer bearing member and there is a passage structure for admitting some of the pressurized oil to the channel.

The inner bearing member has two flanges on opposite ends which extend radially outward from the axis of rotation of the journal. The width of the outer bearing member is slightly less than the width between the two flanges so that the flanges receive the outer bearing member. The outer member cooperates with the pedestal to support the inner bearing member and the journal. On each flange is an annular row of apertures and there is a corresponding row of aligned apertures in the outer bearing member. Resilient bars are inserted through these apertures in a horizontal direction thereby maintaining the bearing members in spaced relation and providing a spring characteristic.

During rotor whirl, the journal radially displaces the inner bearing member. When the bearing is so displaced, it forces the pressurized oil against the outer bearing member resulting in the oil being forced through the various passages, thereby dissipating the whirl energy and causing a damping effect. As the pressurized oil is compressed against the outer bearing member, this tends to radially displace the outer bearing member. The bars, which maintain the bearings in spaced relation, yieldingly oppose any radial movement as would a spring, thereby further restricting radial movement of the journal. Accordingly, the rotor whirl is opposed by a bearing structure having both a viscous incompressible fluid damping effect and a coacting spring effect.

DESCRIPTION OF THE PREFERRED EMBODIMENT

Figure 1:
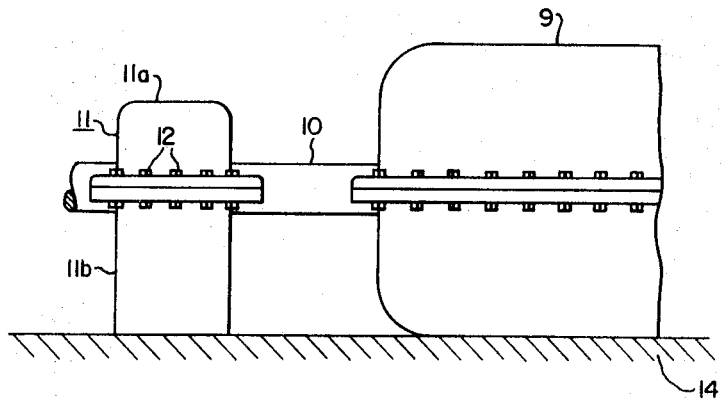
FIG. 1 is a side elevational view of a rotatable mechanism supported by a bearing structure formed in accordance with the present invention.

Referring to the drawings in detail and particularly to FIG. 1, a typical environment for the invention is shown to comprise a prime mover 9, which may preferably be a turbine, and a rotatable shaft 10 which is journaled in a support structure or pedestal 11. The pedestal 11 can be made in an upper half 11a and a lower half 11b, said halves being secured by fastening means 12. The pedestal 11 and the turbine 9 may be suitably mounted on a foundation 14. It is understood that the turbine 9 and the foundation 14 comprises no part of the invention.

Figure 2:
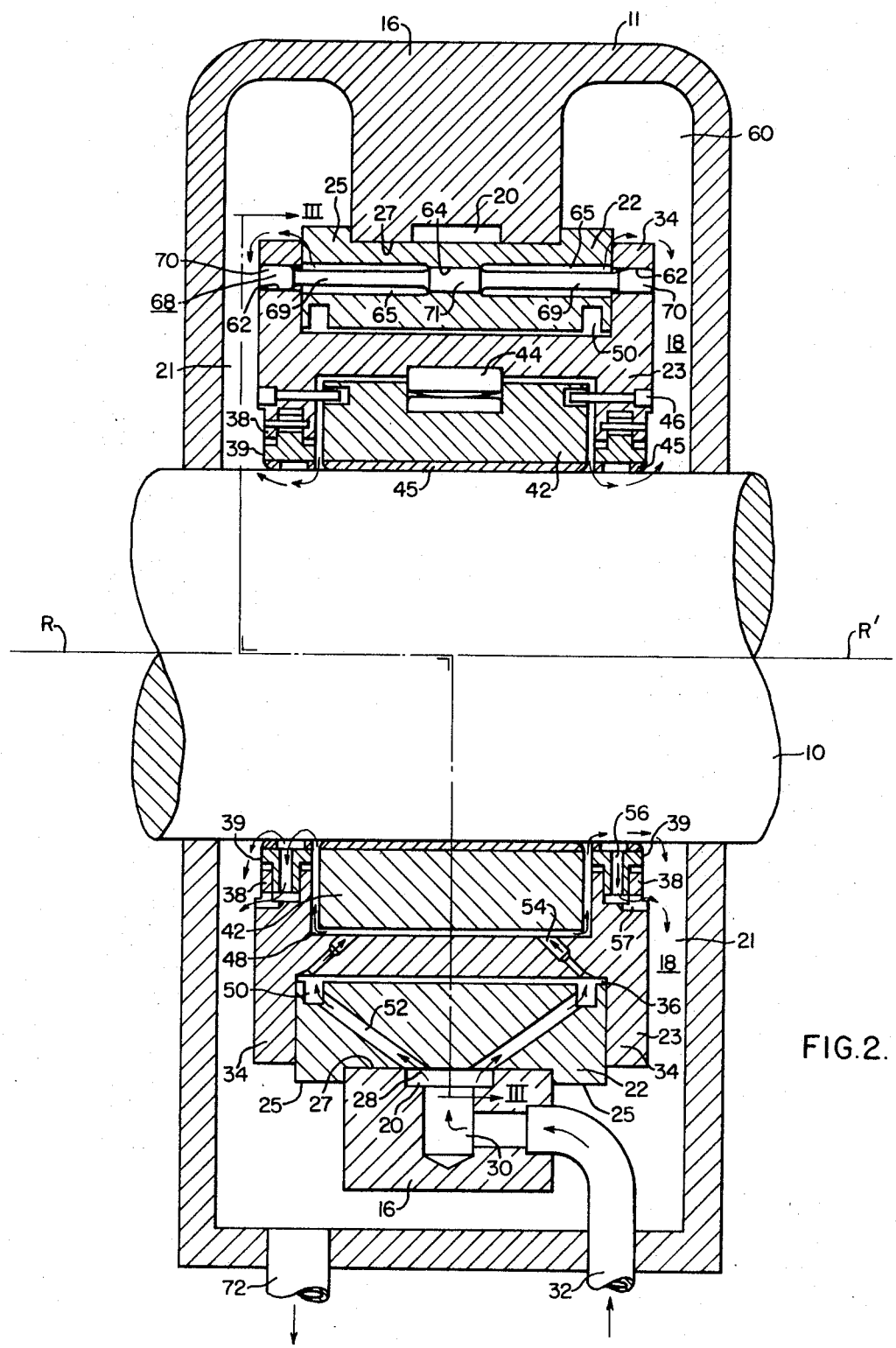
FIG. 2 is an enlarged view in section showing the bearing structure in FIG. 1.

The pedestal 11 has an annular ring portion 16, integral therewith, which supports a bearing structure 18 as best shown in FIG. 2. On the radially inward face of the ring 16 is an annular groove 20 centrally spaced on he ring 16. A cavity 21 is defined by the pedestal walls 11a and 11b.

The bearing structure 18 is comprised of an outer bearing member 22 and an inner bearing member 23 both of which are nonrotatable. The outer bearing member 22 is annular and has on opposite sides two annular flanges 25 extending radially outward from the axis of rotation R-R' of the journal 10. The outer ring 16 has a slightly smaller width than the distance between the two flanges 25 so that the outer member 22 securely fits onto and is supported by the outer ring 16. The circumferential wall 27 between the flanges 25 of the outer bearing member 22 and the groove 20 on the ring 16 jointly define an annular oil inlet channel 28.

A bore or recess 30 is in the lower portion of the ring 16 and is in fluid communication with the oil inlet channel 28. An oil inlet pipe 32 opens into the recess 30 and pressurized oil may be provided from the main oil support of the turbine (not shown).

Figure 3:
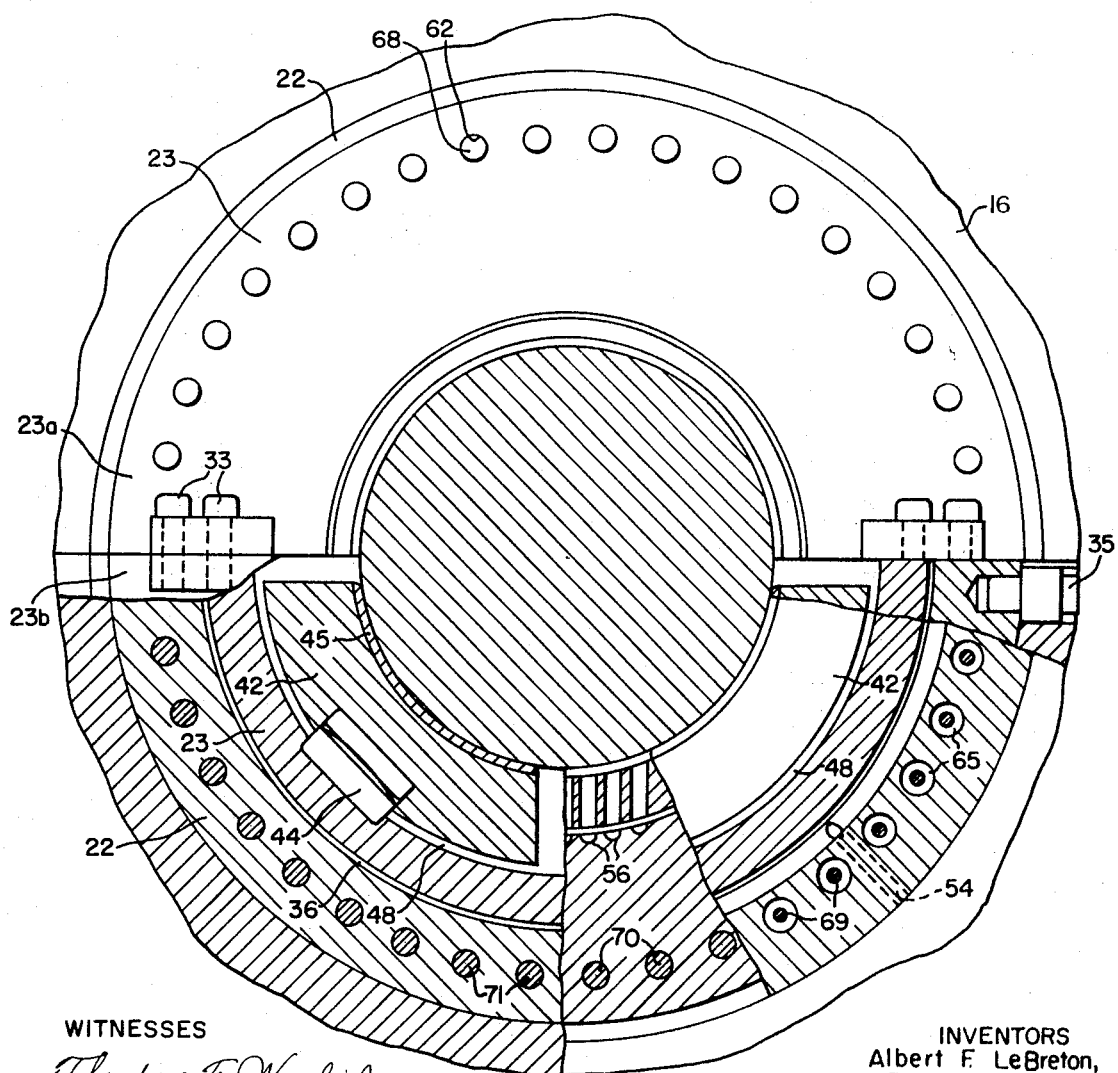
FIG. 3 is a side view, partially in section, taken along line III—III in FIG. 2 with portions cut away for clarity.

The inner bearing member 23 comprises an upper half 23a and a lower half 23b, said halves 23a and 23b being secured by fastening means 33 as shown in FIG. 3. The inner bearing member 23 has two peripheral flanges 34, on opposite ends, which extend radially outward from the axis of rotation R-R' of the journal 10, as best seen in FIG. 2. The width of the outer bearing member 22 is slightly less than the width between the two flanges 34 so that the flanges 34 receive the outer member member 22 in a snug relation. The outer bearing member 22 and the pedestal 11 cooperate to support the inner bearing member 23 and the journal 10. As seen in FIG. 3, a stop dowel 35 is positioned and extended into the outer bearing member 22 to prevent rotation of said member 22. A thin annular damper channel 36 is defined between the two bearing members 22 and 23.

The inner bearing member 23, as shown, is of the tilting-shoe type although it could be of the sleeve-bearing type as well known in the art. The inner bearing member 23, which slidably supports the journal 10, has two annular flanges 38 on opposite ends directed radially inward. An annular seal 39 is connected to each flange 38. Tilting pads or shoes 42 (two of which are shown in FIG. 2 and two in FIG. 3) are arcuate segments which may be in quadrants. The shoes 42 are disposed in a tiltable manner within the inner bearing member 23 by rocker pivots 44. Pins 46 retain the shoes 42 during assembly. A U-shaped annular channel 48 (shown in FIG. 2) is defined by the shoes 42 and the radially inward flanges 38, the seals 39, and the inner bearing member 23. A Babbitt metal coating 45 may be provided on the radially inward surface of the shoes 42 and seals 39.

Two annular grooves 50 are provided on the radially inward portion and on opposite sides of the outer bearing member 22. A circumferential series of internal canals 52 connect the centrally located oil inlet channel 28 to the two grooves 50. The grooves 50 open into the damper channel 36. A circumferential series of internal apertures 54 is located on the inner bearing member 23 connecting the damper channel 36 to the U-shaped channel 48. On the bottom or lower portions of the annular seals 39 are internal radial drain passages 56. The passages 56 exit into horizontal passages 57 in the inner bearing member 23 which in turn drain into the pedestal cavity 21.

A pressurized fluid, such as the bearing lubricating oil used in the turbine system, enters the oil inlet pipe 32 and flows into the recess 30 in the ring portion 16 of the pedestal 11. The oil fills the oil inlet channel 28 and the pressure forces the oil through the outer bearing canals 52 to the annular grooves 50. From the grooves 50, the oil fills the annular damper channel 36. Oil then flows through the internal apertures 54 to the U-shaped channel 48 surrounding the tilting pads 42.

As shown, on the radially outward flanges 34 of the inner bearing member 23 are a pair of annular rows of horizontal apertures 62, the apertures 62 in the corresponding rows being aligned with each other. On the outer bearing member 22 is an annular row of apertures 64 which correspond to and are aligned with the opposed apertures 62 on the inner bearing member 23. The outer bearing apertures 64 have enlarged portions 65. The diameters of the apertures 64 are approximately equal to the diameters of the inner bearing apertures 62 and are concentric. The annular rows of apertures 62 and 64 are concentric with the axis of rotation of the rotor R-R'.

A plurality of resilient circular bars or pins 68 are horizontally inserted through the corresponding apertures 62 and 64. The bars 68 have reduced portions 69 located between the two end portions 70 and the center portions 71. The diameters of the end and center portions 70 and 71 of the bars 68 are approximately equal to the diameters of the apertures 62 and the apertures 64, although the diameters of the portions 70 and 71 may be slightly larger or smaller than apertures 62 and 64. One method of inserting the bars 68 into the apertures 62 and 64 is by shrink fitting the bars 68, as well known in the art. Then, the end portions 70 securely engage the inner bearing member 23, and the middle portion 71 engage the outer bearing member 22. The bars 68 are in compression at portions 70 and 71 in apertures 62 and 64 respectively.

During rotor whirl, the journal 10 radially displaces the shoes 42 and the rocker pivots 44 and the inner bearing member 23.

As the inner bearing member 23 is radially displaced, the oil in the damper channel 36 is forced against the outer bearing member 22, said member 22 being relatively stationary. Some oil is forced through the canals 52 and the small clearance spaces between the flanges 34, on the inner bearing member 23, and the outer bearing member 22. This oil leaks into the pedestal cavity 21. The oil collecting in the pedestal cavity 21 is drained through a pipe 72 back to the oil reservoir (not shown) and repumped. The effect of forcing the oil through the various passages and into the pedestal cavity 21 is to dissipate the whirl energy and to create a damping effect.

As the inner bearing member 23 is radially displaced, the bars 68, which maintain the bearing members 22 and 23 in spaced relation, yieldingly oppose any radial movement. Accordingly, the rotor whirl in the embodiment shown is opposed by a bearing structure having both a viscous incompressible fluid damping effect and a coacting spring effect.

In the embodiment shown and described, the bearing structure 18 is arranged in supporting relation with a horizontal shaft 10. Furthermore, a plurality of resilient bars 68 are provided to maintain a spaced relation between the two bearing members 22 and 23. However, if the bearing structure 18 is employed to support a vertical shaft machine (not shown) or a horizontal shaft machine with very small static bearing loads, then the resilient bars 68 may not be needed to maintain the spaced relation; the hydrodynamic fluid film pressures or squeeze film pressures in the damper channel 36 would be sufficient to maintain the bearing members 22 and 23 in spaced relation.

It will now be seen that the invention provides an arrangement for substantially eliminating or at least minimizing the generation and transmission of vibrations from a rotating shaft to its associated support structure.

Although the invention has been shown in only one form, it will be obvious to those skilled in the art that it is not so limited, but is susceptible of various changes and modifications without departing from the spirit thereof.

What we claim is:

1. In combination, a rotatable shaft having a journal portion,
    an annular bearing structure for rotatably supporting said journal,
    a support structure for said bearing structure,
    said bearing structure comprising an inner bearing member and an outer bearing member,
    means defining an inner bearing surface on said inner bearing member for slidably supporting said journal,
    a pair of radially extending flanged members cooperatively associated with said inner and outer bearing members to position said member relative to each other,
    said bearing members being maintained in spaced relation to provide an annular channel between said inner bearing member and said outer bearing member,
    and means for admitting pressurized liquid to said annular channel.

2. The combination defined in claim 1 and further including a plurality of bars interacting with said bearing members to maintain them in spaced relation.

3. In combination, a rotatable shaft having a journal portion,
    an annular bearing structure for rotatably supporting said journal,
    a support structure for said bearing structure,
    said bearing structure comprising an inner bearing member and an outer bearing member,
    means defining an inner bearing surface on said inner bearing member for slidably supporting said journal,
    said inner bearing member having two annular flanges which are on opposite ends of said member,
    said flanges extending radially outward from the axis of rotation of the journal to receive said outer bearing member,
    said bearing members being maintained in spaced relation to provide an annular channel between said inner bearing member and said outer bearing member,
    and means for admitting pressurized liquid to said annular channel.

4. The combination defined in claim 3 wherein on the flanges on the inner bearing member are a pair of annular rows of apertures and the outer bearing member has a corresponding and aligned annular row of apertures,
    a plurality of resilient bars,
    said bars being received in said apertures in the bearing structure to maintain the bearing members in spaced relation and to further provide a spring and damping characteristic.

5. The combination defined in claim 4 wherein the rows of apertures are concentric with the axis of rotation of the rotor.

6. The combination defined in claim 4, wherein the bars are circular in cross section and have portions which are of reduced diameter,
    the larger diameter portions of the bars engaging the bearing members.

7. In combination, a rotatable shaft subject to transverse vibrations and having a journal portion,
    an annular bearing structure encompassing and rotatably supporting said journal,
    a support structure for said bearing structure,
    said support structure having an annular integral ring portion,
    said bearing structure comprising an inner bearing member and an outer bearing member,
    mean defining an inner bearing surface on said inner bearing member for slidably supporting said journal,
    said outer bearing member having flanges extending radially outward on opposite sides,
    said ring portion fitting between said outer bearing flanges,
    said inner bearing member having flanges extending radially outward on opposite sides of said member to receive said outer bearing member,
    said bearing members jointly defining an annular channel,
    a passage structure for admitting pressurized fluid to said annular channel,
    means maintaining a spaced relation between said bearing members,
    said means comprising a plurality of bars, said flanges on the inner bearing member having a pair of annular rows of apertures, said outer bearing member having an annular row of apertures, aligned with said flanges apertures, and said bars disposed in said apertures to maintain a fixed relation between said bars and said bearing member.

8. The combination defined in claim 7 wherein said inner bearing member has two annular flanges extending radially inward on opposite sides of said member, and said slidably supporting means comprises a series of bearing shoes encompassing the journal, said shoes being disposed in a tiltable manner between said flanges by a corresponding series of rocker pivots.

9. The combination defined in claim 3 and further including a plurality of bars interacting with said bearing members to maintain them in spaced relation.